June 15, 1965  D. J. DEAN  3,188,864
WATER DEPTH GAUGES
Filed Jan. 29, 1962
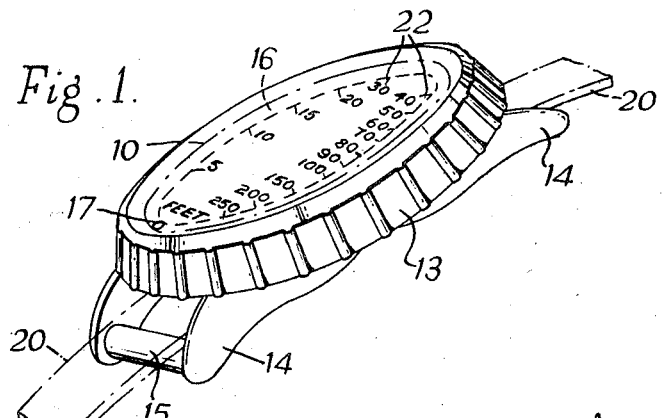
Fig. 1.
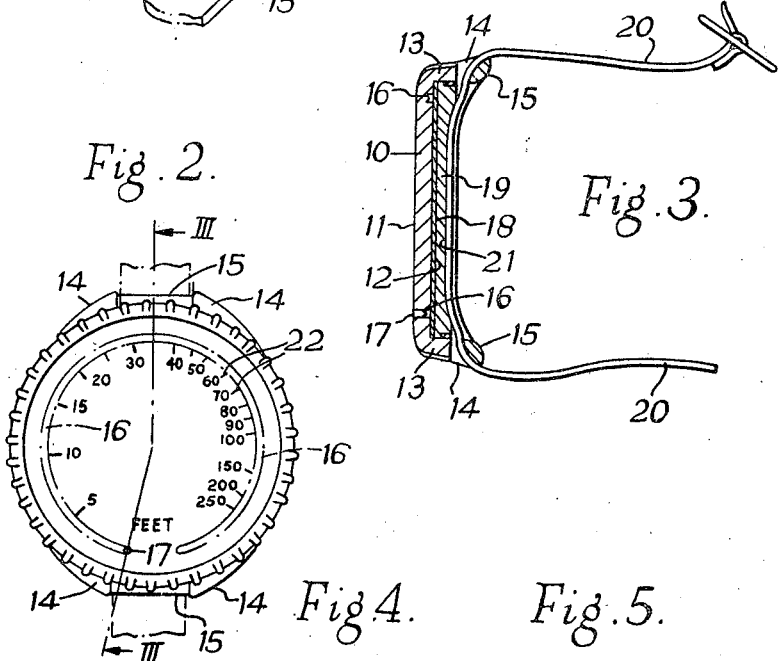
Fig. 2.
Fig. 3.
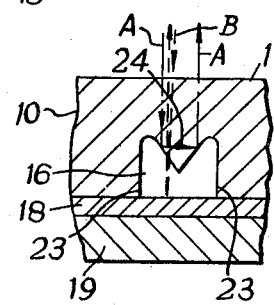
Fig. 4.
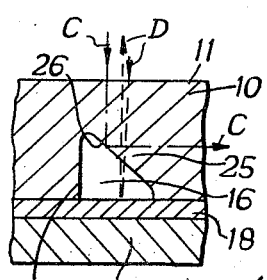
Fig. 5.
Inventor
Derek John Dean

3,188,864
WATER DEPTH GAUGES
Derek John Dean, Enfield, Middlesex, England, assignor to Sangamo Electric Company, Springfield, Ill., a corporation of Delaware
Filed Jan. 29, 1962, Ser. No. 169,377
Claims priority, application Great Britain, Feb. 10, 1961, 5,079/61
4 Claims. (Cl. 73—300)

This invention relates to water depth gauges and is more particularly concerned with a device for use by a diver, particularly a skin diver, for providing an easily readable indication of his depth below the water surface.

One object of the invention is the provision of a simple yet effective device capable of being conveniently worn around the wrist of the diver.

A device in accordance with the present invention for indicating the depth of water in which it is immersed comprises a plate-like member of transparent material having a groove in one surface, a gasket plate held in intimate sealing contact with the grooved surface of said plate-like member whereby said groove is closed and forms a capillary tube, one end of said capillary tube being closed and the other end being arranged for liquid communication by way of a suitable port with an exterior surface of the device exposed to water when the device is immersed and a series of depth-indicating scale markings adjacent said capillary tube along the length thereof.

In a preferred form both the transparent plate-like member and the gasket plate are of circular shape and one of the parts is provided with means for the attachment of a wrist strap whereby it may be worn after the manner of a wrist watch around the wrist of the wearer. Preferably also the said gasket plate is releasably secured in contact with the grooved surface of the transparent plate-like member by means such as a number of interlocking bayonet fixings.

In order that the nature of the invention may be more readily understood, one particular embodiment thereof will now be described by way of illustrative example only and with reference to the accompanying drawing, in which:

FIGURE 1 is a perspective view of a device in accordance with the invention;

FIGURE 2 is a front elevational view of the device;

FIGURE 3 is a cross-sectional view taken approximately on the line III—III of FIGURE 2; while FIGURES 4 and 5 are greatly enlarged fragmentary cross-sectional views of alternative cross-sectional forms of the groove providing the capillary tube.

The device shown comprises a main or cover part 10 of substantially circular disc or plate-like form having a slightly convex front surface 11 and a planar rear surface 12 located within a rearwardly directed peripheral flange 13. This main cover part 10 is transparent and is conveniently formed of a suitable moulded plastic material such as "Perspex."

In the rear surface 12 of the cover part 10 is formed a forwardly directed groove 16 which extends around a part-circular path of rather less than 360° between a port 17 at one end and a closed opposite end. The port 17 extends through the thickness of the cover part 10 whereby the said groove is in liquid communication with the front surface 11. The groove 16 is closed to form a capillary tube by means of a gasket disc or plate 18 which is held in intimate and sealing contact with the rear surface 12 by means of a further base plate 19 which fits within the flange 13 and is provided around its edge with a number of spaced bayonet-type fixings adapted to interlock with corresponding opposite fixing parts carried upon the inner surface of the said flange.

At diametrically opposed points, the base plate 19 is provided with pairs of extension lugs 14 united at their free ends by cross pieces 15 for the reception of a securing strap 20 which is threaded over the cross pieces 15 and serves for attachment of the device to the wrist of the wearer. The rearwardly directed edge surfaces of the lugs 14 are shaped to fit snugly upon the wearer's wrist while the strap 20 is conveniently located within a recessed region 21 in the rearward face of the base plate 19.

Around the near-circular capillary tube formed by the groove 16 and the associated gasket disc 18 are provided a number of graduation markings 22 for use as a depth-indicating scale. Such scale markings are conveniently printed on the rear surface 12 of the cover part 10 in the form of transparent apertures in an otherwise opaque and preferably coloured background layer, e.g. of suitable paint, applied to the surface 12. The gasket disc 18 is also of suitable distinctive colour different from that of the said background layer.

In operation, upon immersion during diving by the wearer, water enters the capillary tube through the port 17 and travels therealong to a distance determined by the water pressure and hence the diving depth.

The groove 16 may have a cross-sectional form as shown in FIGURE 4 in which the groove has substantially parallel side walls 23 at right angles to the rear surface 12 but is formed at its bottom or forwardly facing region with a right-angled prism section 24 so arranged that the right angle apex of the prism section is directed reentrantly into the tube bore, i.e. to face the gasket disc 18. With such a groove formation, when the resultant capillary tube is not filled with water, light incident on the front surface 11 of the device passes through the cover part 10 and is mainly reflected by the background layer on the surface 12 except where it is incident on the prism section 24 of the groove. Here the incident light is substantially totally reflected by the prism section as shown by the arrows "A." As a result, the capillary tube, when viewed from the front of the device, appears as a light of silver band upon a background of the colour of the applied paint or other layer. When, however, any part of the capillary tube becomes filled with water, light incident on the prism section 24 of the water-filled part now passes through the tube section also owing to the approximate matching of the respective refractive indexes of the cover plate material and the water filling and is then reflected by the coloured surface of the gasket disc 18 before being returned forwardly as shown by the arrow "B." That portion of the tube which is filled with water is accordingly now visible as a strip having the colour of the gasket disc and the demarcation line between the filled and unfilled portions is clearly and sharply defined for reference to the adjacent scale markings 22.

An alternate capillary tube section is shown in FIGURE 5 where the prism portion 25 is arranged to provide a single surface 26 lying substantially at 45° to the opposing and parallel side walls 23 of the groove whereby incident light from the front surface of the device is now reflected radially outwards or inwards when the capillary tube is unfilled and the colour of the gasket disc 18 is accordingly not visible until the bore becomes filled with water whereupon it then becomes visible in a manner similar to that described above with reference to FIGURE 4. Arrows "C" and "D" respectively in FIGURE 5 correspond with arrows "A" and "B" in FIGURE 4.

With the arrangement described, the construction is extremely simple enabling at least the cover part 10 and the base plate 19 to be made of moulded plastic material. In addition, the parts are readily separable for ease of cleaning and re-sealing of the capillary tube groove 16 and the port 17. In addition, the colour of the gasket 18 may readily be altered by the use of alternative gasket plates for operation under varying water and light conditions with a view to providing the best possible visibility of the depth indication.

Various alternative constructions may clearly be devised; for instance, the groove 16 may be of different shape in plan for providing a different indication scale layout.

In addition, the cross-sectional area of the capillary tube forming groove may be altered progressively from one end to the other in order to provide a form of scale graduation different from that having an approximately hyperbolic law form as shown. The scale markings 22, instead of being printed on the inside of the cover part 10, may be printed upon the forward-facing surface of the gasket disc 18, while other forms of interconnection between the base plate 19 and the front cover part 10 may be used. The securing strap 20 may be carried by the front cover part 10 instead of the base plate 19 by arranging the extension lugs 14 and cross pieces 15 as integral parts of such cover.

I claim:

1. A device for indicating the depth of water in which it is immersed, said device comprising a transparent front plate having a groove in one surface thereof, and a gasket held in sealing contact with the grooved surface of said plate whereby said groove is closed and forms a capillary tube, one end of said capillary tube being closed and the other end being arranged for liquid communication by way of a suitable port with an exterior surface of said device exposed to water when immersed, said groove having a cross section such that the bottom of the groove is constituted by at least one surface inclined at substantially 45° to the plane of the surface in which it is formed.

2. A device for indicating the depth of water in which it is immersed, said device comprising a transparent front plate having a groove in one surface thereof, and a gasket held in sealing contact with the grooved surface of said plate whereby said groove is closed and forms a capillary tube, one end of said capillary tube being closed and the other end being arranged for liquid communication by way of a suitable port with an exterior surface of said device exposed to water when immersed, the bottom of said groove having a right-angled prism cross section with the apex of said prism directed towards the surface in which said groove is formed.

3. A device for indicating the depth of water in which it is immersed, said device comprising a substantially flat and transparent upper plate having a groove in its under face, and a gasket secured in sealing contact with the under face of said plate effective for closing said groove and providing therewith a capillary tube, said tube being closed at one end and having at its other end a port opening through said plate, the wall of said groove opposed to said gasket having at least one surface inclined at substantially 45° to the plane of the under face of said plate.

4. A device for indicating the depth of water in which it is immersed, said device comprising a substantially flat and transparent upper plate having a groove in its under face, and a gasket secured in sealing contact with the underface of said plate effective for closing said groove and providing therewith a capillary tube, said tube being closed at one end and having at its other end a port opening through said plate, the wall of said groove opposed to said gasket having a surface disposed to produce substantially total reflection of light rays passing through said plate from the upper surface thereof.

References Cited by the Examiner

UNITED STATES PATENTS

| 617,451 | 1/99 | Tanner | 73—300 |
| 2,763,122 | 9/56 | Hayes | 58—126 |
| 2,871,573 | 2/59 | Schenker | 33—207 |

FOREIGN PATENTS

| 1,011,265 | 6/52 | France. |
| 1,130,467 | 2/57 | France. |
| 842,930 | 7/52 | Germany. |

ISAAC LISANN, *Primary Examiner.*